ated Nov. 28, 1972

3,704,299
5-OXOMORPHOLINYL-2,1-BENZISOTHIAZOLINES

Joseph A. Skorcz, 5359 N. Bay Ridge Ave., Milwaukee, Wis. 53217; and John T. Suh, 3709 W. Scenic Drive; and Claude I. Judd, 10904 N. Crestline Road, 39–W, both of Mequon, Wis. 53092
No Drawing. Continuation-in-part of application Ser. No. 798,119, Feb. 10, 1969. This application July 14, 1971, Ser. No. 162,641
Int. Cl. C07d 87/46
U.S. Cl. 260—247.1                           5 Claims

ABSTRACT OF THE DISCLOSURE

The compounds are 5 - oxomorpholinyl - 2,1 - benzisothiazoline-2,2-dioxides useful as central nervous system depressants. The compounds are also useful as intermediates in the preparation of the corresponding 5-morpholinyl-2,1-benzisothiazolines. A compound disclosed is 1-methyl - 5 - (4 - benzyl - 5 - oxo - 2 - morpholinyl)-2,1-benzisothiazoline-2,2-dioxide.

RELATED CASE

This application is a continuation-in-part of our earlier application Ser. No. 798,119 filed Feb. 10, 1969 now U.S. Pat. No. 3,635,964.

DETAILED DESCRIPTION

The compounds of the present invention have the following formula

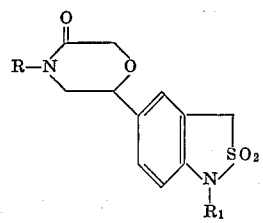

I in which R is hydrogen, a lower alkyl such as methyl, ethyl, isopropyl or butyl, an aralkyl containing 7 to 13 carbon atoms, especially a phenyl-lower alkyl such as benzyl, phenethyl, and phenylisopropyl, phenyl, a halo-substituted phenyl such as p-chlorophenyl or o-chlorophenyl, a lower alkoxy-substituted phenyl such as p-methoxyphenyl and o-ethoxyphenyl, p-trifluoromethylphenyl, hydroxyphenyl, a cycloalkyl of 3 to 7 carbon atoms such as cyclopropyl, cyclopentyl and cyclohexyl, a cycloalkyl-lower alkyl in which the cycloalkyl ring contains 3 to 7 carbon atoms such as cyclopropylethyl, cyclopentylmethyl and cyclohexylethyl and a hydroxy-lower alkyl in which the lower alkyl contains 1 to 4 carbon atoms such as 2-hydroxyethyl and 3-hydroxypropyl, and $R_1$ is selected from a lower alkyl of 1 to 4 carbon atoms, such as methyl, ethyl, propyl, isopropyl or butyl, an aralkyl of 7 to 13 carbon atoms, particularly a phenyl-lower alkyl such as phenethyl or phenylisopropyl, a cycloalkyl of 3 to 7 carbon atoms, such as cyclopropyl, cyclobutyl, cyclohexyl or cyclopentyl and a cycloalkyl-lower alkyl in which the cycloalkyl ring contains 3 to 7 carbon atoms, such as cyclopropylmethyl, cyclopentylethyl and cyclohexylmethyl.

The compounds of the present invention may be conveniently prepared by employing as the basic starting material a compound of the formula

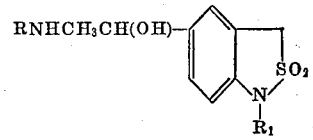

II in which R and $R_1$ are as previously defined and do not interfere with or partake in the reactions.

Representative of the amino alcohols of Formula II which may be employed as starting materials are the following:

1-methyl-5-(2-methylamino-1-hydroxyethyl)-2,1-benzisothiazoline-2,2-dioxide,
1-methyl-5-(2-benzylamino-1-hydroxyethyl)-2,1-benzisothiazoline-2,2-dioxide,
1-ethyl-5-(2-phenylamino-1-hydroxyethyl)-2,1-benzisothiazoline-2,2-dioxide,
1-cyclohexyl-5-(2-benzylamino-1-hydroxyethyl)-2,1-benzisothiazoline-2,2-dioxide, and
1-methyl-5-(2-cyclopropylamino-1-hydroxyethyl)-2,1-benzisothiazoline-2,2-dioxide.

In the preferred method of preparation the amino alcohol of Formula II is treated with chloroacetyl chloride in a suitable solvent such as dichloromethane to form the corresponding N-chloroacetyl derivative which is in turn treated with a suitable base such as ethanolic potassium hydroxide or sodium hydroxide, to effect a ring closure. The resulting 5-oxo-2-morpholinyl derivative upon treatment with sodium borohydride in the presence of boron trifluoride etherate forms the corresponding 2-morpholinyl compound. The process may be illustrated as follows:

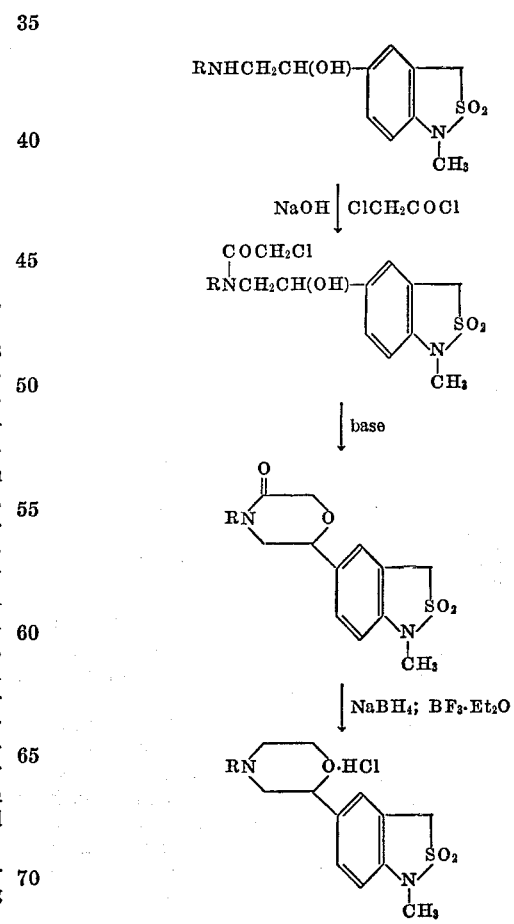

Representative of the novel morpholinyl compounds which may be prepared by the above described reaction are the following:

1-methyl-5-(4-benzyl-5-oxo-2-morpholinyl)-2,1-benzisothiazoline-2,2-dioxide,
1-methyl-5-(4-methyl-5-oxo-2-morpholinyl)-2,1-benzisothiazoline-2,2-dioxide,
1-propyl-5-(4-methyl-5-oxo-2-morpholinyl)-2,1-benzisothiazoline-2,2-dioxide,
1-cyclohexyl-5-(4-methyl-5-oxo-2-morpholinyl)-2,1-benzisothiazoline-2,2-dioxide,
1-methyl-5-(5-oxo-2-morpholinyl)-2,1-benzisothiazoline-2,2-dioxide,
1-methyl-5-(4-benzyl-2-morpholinyl)-2,1-benzisothiazoline-2,2-dioxide,
1-methyl-5-(4-methyl-2-morpholinyl)-2,1-benzisothiazoline-2,2-dioxide,
1-propyl-5-(4-methyl-2-morpholinyl)-2,1-benzisothiazoline-2,2-dioxide,
1-cyclohexyl-5-(4-methyl-2-morpholinyl)-2,1-benzisothiazoline-2,2-dioxide,
1-methyl-5-(4-p-trifluoromethylphenyl-2-morpholinyl)-2,1-benzisothiazoline-2,2-dioxide, and
1-methyl-5-(4-p-hydroxyphenyl-2-morpholinyl)-2,1-benzisothiazoline-2,2-dioxide.

The compounds in which R is hydrogen may be conveniently prepared by subjecting the corresponding compound in which R is benzyl to hydrogenolysis. The cleavage may be conveniently carried out in the presence of a 10% palladium on carbon catalyst by treating the mixture with hydrogen under conventional hydrogenation conditions. The reaction may be illustrated as follows:

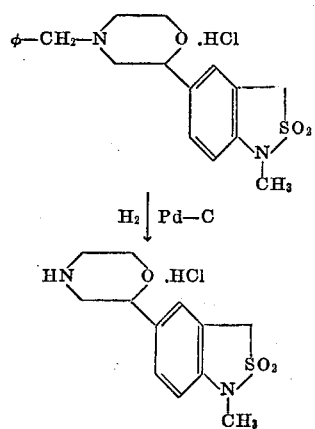

wherein φ represents phenyl.

Representative of the compounds which may be prepared by the described process are the following:

1-methyl-5-(2-morpholinyl)-2,1-benzisothiazoline-2,2-dioxide,
1-cyclohexyl-5-(2-morpholinyl)-2,1-benzisothiazoline-2,2-dioxide, and
1-propyl-5-(2-morpholinyl)-2,1-benzisothiazoline-2,2-dioxide.

The compounds in which R is other than hydrogen may be prepared by either initially employing as a starting material a compound in which R is other than hydrogen or alternatively by treating the corresponding compound in which R is hydrogen with a reactive ester or tosylate under suitable addition conditions. Among the addition agents which may be employed are alkyl halides such as ethyl chloride, butyl chloride, phenyl-lower alkyl halides such as benzyl chloride and phenethyl chloride, cycloalkyl-lower alkyl halides and the like. The compound in which R is methyl is most conveniently prepared by treating the corresponding compound in which R is hydrogen with a solution of 37% formaldehyde in formic acid.

Representative of the compounds which may be prepared by the described processes are the following:

1-methyl-5-(4-phenethyl-2-morpholinyl)-2,1-benzisothiazoline-2,2-dioxide, and
1-methyl-5-(4-p-trifluoromethylphenethyl-2-morpholinyl)-2,1-benzisothiazoline-2,2-dioxide.

The compounds in which R is hydroxy-lower alkyl may be conveniently prepared by treating the corresponding unsubstituted compound, that is, the compound in which R is hydrogen with an alkylene oxide such as ethylene oxide in a suitable solvent such as methanol/tetrahydrofuran. The reaction may be illustrated as follows:

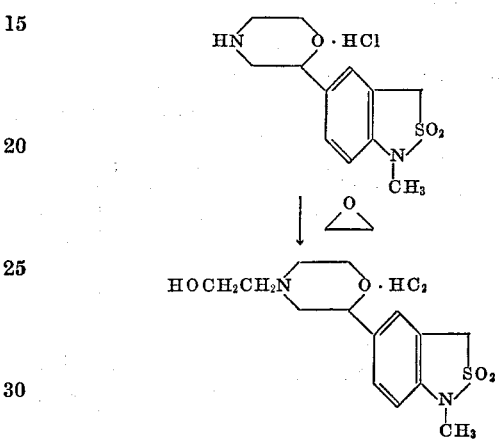

Representative of the compounds which may be prepared by the described process are the following:

1-methyl-5-(4-β-hydroxyethyl-2-morpholinyl)-2,1-benzisothiazoline-2,2-dioxide,
1-ethyl-5-(4-β-hydroxypropyl-2-morpholinyl)-2,1-benzisothiazoline-2,2-dioxide,
and 1-methyl-5-(4-β-hydroxyphenethyl-2-morpholinyl)-2,1-benzisothiazoline-2,2-dioxide.

The novel compounds of the invention have been found to elicit a central nervous system depressant effect in animals. For example, the compounds 1-methyl-5-(4-benzyl-5-oxo-2-morpholinyl)-2,1-benzisothiazoline-2,2-dioxide, 1-methyl-5-(4-benzyl - 2 - morpholinyl)-2,1-benzisothiazoline-2,2-dioxide hydrochloride, and 1-methyl-5-(2-morpholinyl)-2,1-benzisothiazoline-2,2-dioxide hydrochloride in behavioral screening tests have produced in mice a behavioral profile typical of that produced by mild central nervous system depressants of the tranquilizer type. In mice receiving 100 mg./kg. of the compounds intraperitoneally as a 5% aqueous suspension, the posture, righting reflex and muscle tone of the animal were depressed. As an added result of the behavioral testing the compounds were found to have $LD_{50}$'s of approximately 175 mg./kg. The behavioral studies were conducted in accordance with the procedures set forth by Irwin in "Animal and Clinical Pharmacologic Techniques in Drug Evaluation," J. H. Nodine and P. E. Siegler, Ed., Year Book Publishers, Inc. (1964) pp. 36–54.

Acid addition salts of the compounds may be conveniently prepared by contacting those compounds capable of forming such salts with a suitable acid such as hydrochloric acid, hydrobromic acid, sulphuric acid, phosphoric acid, fumaric acid, citric acid, maleic aid and succinic acid.

When used as pharmaceutical agents it is preferred to combine the compounds or their nontoxic salts with conventional pharmaceutical additives, such as diluents, flavoring agents, disintegrating agents, and to form them into conventional unit dosage forms, such as tablets or capsules for oral use or sterile liquids for parenteral administration.

The unit dosage forms such as tablets or capsules will generally contain a concentration of 0.1% to 10% by weight of one or more of the active ingredients. While the exact daily dose of the active ingredient will depend upon many factors including the severity of the patient's condition and the other medication being administered, it will generally range from 10 to 250 mg. per day.

A typical tablet may have the following formula:

| | Mg. |
|---|---|
| 1-methyl-5-(4-benzyl - 5 - oxo-2-morpholinyl)-2,1-benzisothiazoline-2,2-dioxide | 20 |
| Lactose U.S.P. | 135 |
| Corn starch | 25 |
| Corn starch (as 10% paste) | 3.4 |
| Magnesium stearate | 1.3 |

The tablets are formed by conventional techniques using a 5/16 inch diameter punch.

A typical capsule may be prepared by filling a No. 3 hard gelatin capsule with the following ingredients:

| | Mg. |
|---|---|
| 1-methyl-5-(2-morpholinyl) - 2,1 - benzisothiazoline-2,2-dioxide hydrochloride | 20 |
| Lactose U.S.P. | 190 |
| Starch U.S.P. | 25 |
| Talc U.S.P. | 8 |

The thiocyanic acid addition salts of the compounds when condensed with formaldehyde form resinous materials useful as pickling agents according to U.S. Pats. 2,425,320 and 2,606,155. The compounds also form fluosilicic acid addition salts which are useful as wood preservatives and mothproofing agents in accordance with U.S. Pats. 1,915,334 and 2,075,359.

The following examples are presented to illustrate the practice of this invention:

EXAMPLE 1

1-methyl-5-bromoacetyl-2,1-benzisothiazoline-2,2-dioxide

To a stirred mixture of 1-methyl-2,1-benzisothiazoline-2,2-dioxide (16.5 g., 0.9 mole) and 32.7 g. (0.162 mole) of bromoacetyl bromide in 70 ml. of carbon disulfide is added portionwise 36 g. (0.27 mole) of aluminum chloride. The resulting reddish-brown mass is stirred for 30 minutes and allowed to stand at room temperature overnight. The gummy material is poured into 400 ml. of ice water containing 7 ml. of concentrated HCl. The resulting yellow solid is filtered, washed with water, and dried. Recrystallization from chloroform-benzene-petroleum ether provides 1-methyl-5-bromoacetyl-2,1-benzisothiazoline-2,2-dioxide as a yellow powder, M.P. 146–147.5°.

Analysis.—Calcd. for $C_{10}H_{10}BrNO_3S$ (percent): C, 39.49; H, 3.31; N, 4.61. Found (percent): C, 39.83; H, 3.40; N, 4.84.

EXAMPLE 2

1-methyl-5-benzylaminoacetyl-2,1-benzisothiazoline-2,2-dioxide hydrobromide

To a stirred solution of benzylamine (8.6 g., 0.08 mole) in 200 ml. of tetrahydrofuran under nitrogen is added 12.2 g. (0.04 mole) of the bromoketone of Example 1 over a 30 minute period. After an additional hour of stirring, the solvent is removed under vacuum and replaced by 300 ml. of acetone. The insoluble material is filtered and dried to give 1-methyl-5-benzylaminoacetyl-2,1-benzisothiazoline-2,2-dioxide hydrobromide in the form of a very pale yellow powder, M.P. >360°.

Analysis.—Calcd. for $C_{17}H_{19}BrN_2O_3S$ (percent): C, 49.64; H, 4.66; N, 6.81. Found (percent): C, 50.19; H, 4.76; N, 6.68.

EXAMPLE 3

1-methyl-5-(2-benzylamino-1-hydroxyethyl)-2,1-benzisothiazoline-2,2-dioxide

To a cooled suspension of the aminoketone salt (4.94 g., 0.012 mole) in 75 ml. of MeOH is added 1.36 g. (0.036 mole) of sodium borohydride over a 30-minute period. The mixture is stirred at room temperature for 18 hours and then refluxed for 2 hours. After acidification with 4 N HCl, the solvent is evaporated to near dryness and the residue is stirred with chloroform (60 ml.) and 5% aqueous NaOH (40 ml.) for 2 hours. The separated aqueous layer is washed with additional chloroform, which is combined with the initial chloroform solution, washed with saturated brine, dried ($K_2CO_3$) and evaporated. Recrystallization of the residual solid from chloroform-petroleum ether provides 1-methyl-5-(2-benzylamino-1-hydroxyethyl)-2,1-benzisothiazoline - 2,2 - dioxide in the form of a cream-colored powder, M.P. 127–129°.

Analysis.—Calcd. for $C_{17}H_{20}N_2O_3S$ (percent): C, 61.42; H, 6.06; N, 8.43. Found (percent): C, 60.76; H, 6.01; N, 8.18.

EXAMPLE 4

1-methyl-5-(N-chloroacetyl-2-benzylamino-1-hydroxyethyl)-2,1-benzisothiazoline-2,2-dioxide A cooled and stirred mixture of the amino alcohol of Example 3 (16.8 g., 0.05 mole) and NaOH (2.8 g., 0.07 mole) in dichloromethane (125 ml.)-water (50 ml.) is treated dropwise with a solution of chloroacetyl chloride (7.9 g., 0.07 mole) in 10 ml. of dichloromethane over a 20 minute period. After 30 minutes, the ice bath is removed, and stirring continued at room temperature for 3.5 hours. The organic layer is separated, washed with 5% NaOH and saturated brine, dried ($Na_2SO_4$), and evaporated. Elution of the residual gum from silica with chloroform-methanol (3:1) provides 1-methyl-5-(N-chloroacetyl-2-benzylamino - 1 - hydroxyethyl)-2,1-benzisothiazoline-2,2-dioxide as a gummy foam.

EXAMPLE 5

1-methyl-5-(4-benzyl-5-oxo-2-morpholinyl)-2,1-benzisothiazoline-2,2-dioxide

To a stirred, cloudy solution of the amide of Example 4 (18.8 g., 0.046 mole) in 100 ml. absolute ethanol at room temperature is added a solution of KOH (3.1 g., 0.055 mole) in 50 ml. of ethanol over a 30-minute period. The mixture is stirred for 22 hours, evaporated to near dryness, and treated with water (150 ml.). The insoluble pale yellow powder is filtered and dried, M.P. 143–145°. An analytical sample of 1-methyl-5-(4-benzyl-5-oxo-2-morpholinyl)-2,1-benzisothiazoline - 2,2 - dioxide is recrystallized from chloroform-petroleum ether and melts at 143–144.5°.

Analysis.—Calcd. for $C_{19}H_{20}N_2O_4S$ (percent): C, 61.27; H, 5.41; N, 7.52. Found (percent): C, 61.33; H, 5.47; N, 7.51.

EXAMPLE 6

1-methyl-5-(4-benzyl-2-morpholinyl)-2,1-benzisothiazoline-2,2-dioxide hydrochloride To a cooled and stirred suspension of 1-methyl-5-(4-benzyl-5-oxo - 2 - morpholinyl)-2,1-benzisothiazoline-2,2-dioxide (22.3 g., 0.06 mole) and $NaBH_4$ (3.4 g., 0.09 mole) in 150 ml. of tetrahydrofuran is added under nitrogen a solution of boron trifluoride etherate (15.2 ml., 0.12 mole) in 80 ml. of tetrahydrofuran over a 1 hour period. The mixture is stirred at room temperature for 23 hours, treated with 40 ml. of 4 N HCl, stirred an additional 3 hours, and then evaporated under reduced pressure. To the residual semi-solid is added 150 ml. of MeOH, and the cloudy solution is refluxed for 18 hours, cooled, and evaporated to near dryness. The residue is stirred with chloroform (200 ml.)-10% NaOH (150 ml.) for 3 hours, then the organic layer is separated, washed with brine, dried, and evaporated. The resulting pale amber, opaque gum is dissolved in chloroform and treated with ethereal HCl giving a flocculent, white solid. The dried cream-colored granules melt at 227–228.5°. An analytical sample of 1-methyl-5-(4-benzyl-2-morpholinyl)-2,1-benzisothiazoline-2,2-dioxide hydrochloride recrystallized from ethanol-methanol-ether melts at 229.5–230°.

*Analysis.*—Calcd. for $C_{19}H_{23}ClN_2O_3S$ (percent): C, 57.78; H, 5.87; N, 7.09. Found (percent): C, 58.04; H, 5.97; N, 6.95.

EXAMPLE 7

1-methyl-5-(2-morpholinyl)-2,1-benzisothiazoline-2,2-dioxide hydrochloride

To a solution of the hydrochloride of Example 6 (3.95 g., 0.01 mole) in ethanol (100 ml.)-water (40 ml.) is added 0.4 g., of 10% palladium on carbon, and the suspension treated with hydrogen at 3 atm. in a Parr apparatus. After 17 hours the catalyst is removed, and the filtrate evaporated to dryness. Recrystallization of the residual solid from ethanol-methanol-ether provides 1-methyl-5-(2-morpholinyl) - 2,1 - benzisothiazoline-2,2-dioxide hydrochloride as a white powder, M.P. 211–212°.

*Analysis.*—Calcd. for $C_{12}H_{17}ClN_2O_3S$ (percent): C, 47.28; H, 5.62; N, 9.20. Found (percent): C, 47.54; H, 5.50; N, 9.21.

EXAMPLE 8

1-methyl-5-(4-methyl-2-morpholinyl)-2,1-benzisothiazoline-2,2-dioxide hydrochloride A 4.4 g. sample (0.016 mole) of the free amine of Example 7, isolated as a white solid from 5.35 g. of the hydrochloride, is heated on a steam bath for 5 hours in a solution of 37% formaldehyde (20 ml.) and 10 ml. of formic aicd. The cooled solution is diluted with water, extracted with ether, made alkaline with solid NaOH, and extracted with three portions (50 ml. each) of ether. The dried solvent is evaporated, and the residual gummy solid taken up in chloroform-ether, treated with ethereal HCl, and cooled. The resulting white powder is filtered and recrystallized from ethanol-methanol (1:1) to yield 1-methyl - 5 - (4 - methyl-2-morpholinyl)-2,1-benzisothiazoline-2,2-dioxide hydrochloride as small white flakes, M.P. 229–230°.

*Analysis.*—Calcd. for $C_{13}H_{19}ClN_2O_3S$ (percent): C, 48.97; H, 6.00; N, 8.79. Found (percent): C, 49.27; H, 5.71; N, 8.61.

EXAMPLE 9

1-methyl-5-[4-(2-hydroxyethyl)-2-morpholinyl)]-2,1-benzisothiazoline-2,2-dioxide hydrochloride To a stirred solution of the free amine of Example 7 (4 g., 0.015 mole) in 80 ml. methanol-20 ml. tetrahydrofuran containing 1 drop of 1% HCl is added dropwise a solution of ethylene oxide (0.7 g., 0.016 mole) in 20 ml. of methanol. After 24 hours, the solvent is evaporated, and the residual oil eluted from alumina with chloroform-methanol (15:1). The resulting pale yellow oil is converted to a hydrochloride salt which is recrystallized from methanol-ether to yield 1-methyl-5-[4-(2-hydroxyethyl)-2-morpholinyl] - 2,1 - benzisothiazoline-2,2-dioxide hydrochloride as a white powder, M.P. 171–173°.

*Analysis.*—Calcd. for $C_{14}H_{21}ClN_2O_4S$: (percent): C, 48.20; N, 6.07; N, 8.03. Found (percent): C, 48.18; H, 5.78; N, 7.95.

We claim:

1. A compound selected from compounds of the formula

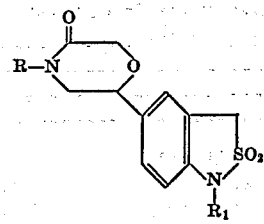

in which R is hydrogen, lower alkyl of 1 to 4 carbon atoms, and phenyl-lower alkyl of 7 to 13 carbon atoms and $R_1$ is a lower alkyl of 1 to 4 carbons and acid addition salts thereof.

2. A compound of claim 1 in which $R_1$ methyl.
3. A compound of claim 1 in which R is benzyl and $R_1$ is methyl.
4. A compound of claim 1 in which R is hydrogen and $R_1$ is methyl.
5. A compound of claim 1 in which R and $R_1$ are methyl.

No references cited.

ALEX MAZEL, Primary Examiner

J. TOVAR, Assistant Examiner

U.S. Cl. X.R.

260—301; 424—248